(12) United States Patent
Lubbers et al.

(10) Patent No.: US 7,237,062 B2
(45) Date of Patent: Jun. 26, 2007

(54) STORAGE MEDIA DATA STRUCTURE SYSTEM AND METHOD

(75) Inventors: Clark E. Lubbers, Colorado Springs, CO (US); Randy L. Roberson, New Port Richey, FL (US)

(73) Assignee: Seagate Technology LLC, Scotts Valley, CA (US)

( * ) Notice: Subject to any disclaimer, the term of this patent is extended or adjusted under 35 U.S.C. 154(b) by 420 days.

(21) Appl. No.: 10/817,264

(22) Filed: Apr. 2, 2004

(65) Prior Publication Data

US 2005/0223156 A1 Oct. 6, 2005

(51) Int. Cl.
G06F 12/00 (2006.01)

(52) U.S. Cl. .......................................... 711/114; 714/6

(58) Field of Classification Search ...................... None
See application file for complete search history.

(56) References Cited

U.S. PATENT DOCUMENTS

| | | | | |
|---|---|---|---|---|
| 5,258,984 A | * | 11/1993 | Menon et al. ................ | 714/7 |
| 5,351,246 A | | 9/1994 | Blaum et al. | |
| 5,488,701 A | | 1/1996 | Brady et al. | |
| 5,574,851 A | * | 11/1996 | Rathunde ....................... | 714/7 |
| 5,651,133 A | | 7/1997 | Burkes et al. | |
| 5,657,439 A | | 8/1997 | Jones et al. | |
| 5,737,623 A | | 4/1998 | Liebrock | |
| 5,845,319 A | * | 12/1998 | Yorimitsu ..................... | 711/114 |
| 6,075,545 A | | 6/2000 | De Bonet et al. | |
| 6,311,251 B1 | * | 10/2001 | Merritt et al. ............... | 711/114 |
| 6,425,052 B1 | * | 7/2002 | Hashemi ........................ | 711/114 |
| 6,477,632 B1 | | 11/2002 | Kikuchi | |
| 6,757,862 B1 | | 6/2004 | Marianetti, II | |
| 6,775,792 B2 | | 8/2004 | Ulrich et al. | |
| 6,779,095 B2 | * | 8/2004 | Selkirk et al. ............... | 711/165 |
| 6,938,123 B2 | * | 8/2005 | Willis et al. ................ | 711/114 |
| 6,961,815 B2 | * | 11/2005 | Kistler et al. ............... | 711/114 |
| 7,127,557 B2 | * | 10/2006 | Ito et al. ..................... | 711/114 |
| 2002/0032832 A1 | | 3/2002 | Dykes et al. | |
| 2002/0053009 A1 | * | 5/2002 | Selkirk et al. .............. | 711/162 |
| 2002/0062422 A1 | | 5/2002 | Butterworth et al. | |

(Continued)

FOREIGN PATENT DOCUMENTS

WO    WO 03/038628 A1    5/2003

Primary Examiner—Kevin Verbrugge
(74) Attorney, Agent, or Firm—Fellers, Snider, et al.

(57) ABSTRACT

Disclosed is a data storage architecture employing a plurality of data grids each comprising an array of equal capacity data storage blocks organized into a plurality of rows and a plurality of columns such that each column corresponds to a storage domain in a data storage system and each row of the plurality of rows corresponds to a plurality of data storage blocks, one data storage block from each column of the plurality of columns at the same physical address, with the plurality of rows each having a plurality of contiguous data storage blocks in each domain. Capacity grids are produce by applying one of a plurality of sparing versions that designate at least one data storage block in each row of the grid is designated as spare, Defined within each capacity grid are one or more data storage units. Each data storage unit reflects a storage format, such as a RAID level, and defines data storage blocks, mirror data blocks, and parity data blocks depending upon storage the format and can provide fault tolerance in the event of a domain failure. User data is stored exclusively in a first portion of the grid and parity data, if any, is exclusively stored in a second portion of the grid, providing optimized performance. Data access employs metadata that may comprise grid and storage unit descriptors, data storage unit format, and a sparing table.

23 Claims, 22 Drawing Sheets

RAID-5
Grid
804

| A | A | A | A | B | B | B | B |
|---|---|---|---|---|---|---|---|
| C | C | C | C | D | D | D | D |
| E | E | E | E | F | F | F | F |
| G | G | G | G | H | H | H | H |
| PB | PD | PF | PH | PA | PC | PE | PG |

U.S. PATENT DOCUMENTS

| | | |
|---|---|---|
| 2002/0103889 A1 | 8/2002 | Markson et al. |
| 2002/0194526 A1 | 12/2002 | Ulrich et al. |
| 2003/0005248 A1* | 1/2003 | Selkirk et al. .............. 711/165 |
| 2004/0010503 A1 | 1/2004 | Williams |
| 2004/0015655 A1* | 1/2004 | Willis et al. ................ 711/114 |
| 2004/0111558 A1* | 6/2004 | Kistler et al. ............... 711/114 |
| 2004/0123296 A1 | 6/2004 | Challenger et al. |
| 2004/0133607 A1 | 7/2004 | Miloushev et al. |
| 2004/0133743 A1* | 7/2004 | Ito et al. ..................... 711/114 |
| 2004/0153479 A1 | 8/2004 | Mikesell et al. |
| 2004/0215603 A1 | 10/2004 | Sonkin et al. |
| 2005/0086429 A1* | 4/2005 | Chatterjee et al. .......... 711/114 |
| 2005/0138284 A1* | 6/2005 | Cohn et al. ................. 711/114 |

\* cited by examiner

Figure 3

Sparing Table 300

304 Sparing Versions

302 Drives

| Drives / Version | A | C | E | G | I | | B | D | F | H | J |
|---|---|---|---|---|---|---|---|---|---|---|---|
| SV1 | u | u | u | u | s | | u | u | u | u | s |
| SV2 | u | u | u | s | u | | u | u | u | s | u |
| SV3 | u | u | s | u | u | | u | u | s | u | u |
| SV4 | u | s | u | u | u | | u | s | u | u | u |
| SV5 | s | u | u | u | u | | s | u | u | u | u |

Group 1 Drives 306

Group 2 Drives 308

Chapter Table 400

| Paragraph | Group 1 | Group 2 | Spare |
|---|---|---|---|
| 1 | A C E G | B D F H | I J |
| 2 | C E G I | D F H J | A B |
| 3 | G A I E | H B J F | C D |
| 4 | A I G C | B J H D | E F |
| 5 | E A C I | F B D J | G H |

Paragraphs 402 / Group 1 Drives 404 / Group 2 Drives 406 / Spare Drives 408

Capacity Grid 410

Group 1 412 / Group 2 414

Figure 5A

Single Row RAID-0 Grid 500

| Data A-1 | Data A-2 | Data A-3 | Data A-4 | Data B-1 | Data B-2 | Data B-3 | Data B-4 |
|---|---|---|---|---|---|---|---|

Figure 5B

Two Row RAID-0 Grid 502

| Data A-1 | Data A-2 | Data A-3 | Data A-4 | Data B-1 | Data B-2 | Data B-3 | Data B-4 |
|---|---|---|---|---|---|---|---|
| Data C-1 | Data C-2 | Data C-3 | Data C-4 | Data D-1 | Data D-2 | Data D-3 | Data D-4 |

Figure 5C

Five Row RAID-0 Grid 504

| Data A-1 | Data A-2 | Data A-3 | Data A-4 | Data B-1 | Data B-2 | Data B-3 | Data B-4 |
|---|---|---|---|---|---|---|---|
| Data C-1 | Data C-2 | Data C-3 | Data C-4 | Data D-1 | Data D-2 | Data D-3 | Data D-4 |
| Data E-1 | Data E-2 | Data E-3 | Data E-4 | Data F-1 | Data F-2 | Data F-3 | Data F-4 |
| Data G-1 | Data G-2 | Data G-3 | Data G-4 | Data H-1 | Data H-2 | Data H-3 | Data H-4 |
| Data I-1 | Data I-2 | Data I-3 | Data I-4 | Data J-1 | Data J-2 | Data J-3 | Data J-4 |

Figure 6A

Single Row RAID-1 Grid 600

| Data A-1 | Data A-2 | Data A-3 | Data A-4 | Data A-1 | Data A-2 | Data A-3 | Data A-4 |
|---|---|---|---|---|---|---|---|

Figure 6B

Two Row RAID-1 Grid 602

| Data A-1 | Data A-2 | Data A-3 | Data A-4 | Data B-1 | Data B-2 | Data B-3 | Data B-4 |
|---|---|---|---|---|---|---|---|
| Data B-1 | Data B-2 | Data B-3 | Data B-4 | Data A-1 | Data A-2 | Data A-3 | Data A-4 |

Figure 6C

Five Row RAID-1 Grid 604

| Data A-1 | Data A-2 | Data A-3 | Data A-4 | Data B-1 | Data B-2 | Data B-3 | Data B-4 |
|---|---|---|---|---|---|---|---|
| Data C-1 | Data C-2 | Data C-3 | Data C-4 | Data D-1 | Data D-2 | Data D-3 | Data D-4 |
| Data E-1 | Data E-2 | Data E-3 | Data E-4 | Data A-1 | Data A-2 | Data A-3 | Data A-4 |
| Data B-1 | Data B-2 | Data B-3 | Data B-4 | Data C-1 | Data C-2 | Data C-3 | Data C-4 |
| Data D-1 | Data D-2 | Data D-3 | Data D-4 | Data E-1 | Data E-2 | Data E-3 | Data E-4 |

RAID-0 Grid 800

| A | A | A | A | B | B | B | B |
| C | C | C | C | D | D | D | D |
| E | E | E | E | F | F | F | F |
| G | G | G | G | H | H | H | H |
| I | I | I | I | J | J | J | J |

RAID-1 Grid 802

| A | A | A | A | B | B | B | B |
| C | C | C | C | D | D | D | D |
| E | E | E | E | A | A | A | A |
| B | B | B | B | C | C | C | C |
| D | D | D | D | E | E | E | E |

RAID-5 Grid 804

| A | A | A | A | B | B | B | B |
| C | C | C | C | D | D | D | D |
| E | E | E | E | F | F | F | F |
| G | G | G | G | H | H | H | H |
| PB | PD | PF | PH | PA | PC | PE | PG |

Figure 9A

RAID-0 Grid 900

| A | A | A | A | B | B | B | B |
|---|---|---|---|---|---|---|---|
| C | C | C | C | D | D | D | D |
| E | E | E | E |   |   |   |   |
| G | G | G | G |   |   |   |   |
|   |   |   |   |   |   |   |   |

Figure 9B

RAID-1 Grid 902

| A | A | A | A | B | B | B | B |
|---|---|---|---|---|---|---|---|
| C | C | C | C | D | D | D | D |
| E | E | E | E | A | A | A | A |
| B | B | B | B | C | C | C | C |
| D | D | D | D | E | E | E | E |

Figure 9C

RAID-5 Grid 904

| A | A | A | A | B | B | B | B |
|---|---|---|---|---|---|---|---|
| C | C | C | C | D | D | D | D |
| E | E | E | E |   |   |   |   |
|   |   |   |   |   |   |   |   |
| PB | PD |   |   | PA | PC | PE |   |

Figure 10A

| A | A | A | A | B | B | B | B |
|---|---|---|---|---|---|---|---|
| C | C | C | C | D | D | D | D |
| E | E | E | E | F | F | F | F |
| G | G | G | G | H | H | H | H |
| I | I | I | I | J | J | J | J |
| K | K | K | K | L | L | L | L |
| M | M | M | M | N | N | N | N |
| O | O | O | O | P | P | P | P |
| | | Parity | | | | Parity | |
| | | Parity | | | | Parity | |

RAID 6
Capacity Grid
1000

Data Sets
1002

Figure 10B

RAID 6 Data / Parity Map 1002

| | | | | | | | | |
|---|---|---|---|---|---|---|---|---|
| A-1 | A-2 | A-3 | A-4 | E-5 | E-6 | E-7 | E-8 | |
| B-8 | B-1 | B-2 | B-3 | F-4 | F-5 | F-6 | F-7 | |
| C-7 | C-8 | C-1 | C-2 | G-3 | G-4 | G-5 | G-6 | |
| D-6 | D-7 | D-8 | D-1 | H-2 | H-3 | H-4 | H-5 | Data 1 |
| I-10 | I-9 | I-12 | I-11 | M-14 | M-13 | M-16 | M-15 | |
| J-9 | J-16 | J-11 | J-10 | N-13 | N-12 | N-15 | N-14 | |
| K-16 | K-15 | K-10 | K-9 | O-12 | O-11 | O-14 | O-13 | |
| L-15 | L-14 | L-9 | L-16 | P-11 | P-10 | P-13 | P-12 | |
| 13P | 5P | 15P | 7P | 9P | 1P | 11P | 3P | Vertical Parity (VPAR-1) |
| 14P | 6P | 16P | 8P | 10P | 2P | 12P | 4P | |
| EP | MP | FP | NP | AP | IP | BP | JP | Row Parity (RPAR-1) |
| GP | OP | HP | PP | CP | KP | DP | LP | |

Data Blocks 1004

Parity Blocks 1006

Grid Contents 1008

Figure 12

RAID 6 Reconstruction Example 1200

| Steps 1202 | Regenerated Blocks 1204 | | Calculations 1206 | | | | | | | |
|---|---|---|---|---|---|---|---|---|---|---|
| Step 1 | A-2 | = | B-2 | XOR | C-2 | XOR | H-2 | XOR | 2P | |
| | I-10 | = | J-10 | XOR | K-10 | XOR | P-10 | XOR | 10P | |
| | 13P | = | M-13 | XOR | N-13 | XOR | O-13 | XOR | P-13 | |
| | 5P | = | E-5 | XOR | F-5 | XOR | G-5 | XOR | H-5 | |
| | EP | = | E-5 | XOR | E-6 | XOR | E-7 | XOR | E-8 | |
| | MP | = | M-14 | XOR | M-13 | XOR | M-16 | XOR | M-15 | |
| | GP | = | G-3 | XOR | G-4 | XOR | G-5 | XOR | G-6 | |
| | OP | = | O-12 | XOR | O-11 | XOR | O-14 | XOR | O-13 | |
| Step 2 | A-1 | = | A-2 | XOR | A-3 | XOR | A-4 | XOR | AP | |
| | I-9 | = | I-10 | XOR | I-12 | XOR | I-11 | XOR | IP | |
| Step 3 | B-1 | = | A-1 | XOR | C-1 | XOR | D-1 | XOR | 1P | |
| | J-9 | = | I-9 | XOR | K-9 | XOR | L-9 | XOR | 9P | |
| Step 4 | B-8 | = | B-1 | XOR | B-2 | XOR | B-3 | XOR | 2P | |
| | J-16 | = | J-9 | XOR | J-13 | XOR | J-10 | XOR | JP | |
| Step 5 | C-8 | = | B-8 | XOR | D-8 | XOR | E-8 | XOR | 8P | |
| | K-16 | = | J-16 | XOR | M-16 | XOR | L-16 | XOR | 15P | |
| Step 6 | C-7 | = | C-8 | XOR | C-1 | XOR | C-2 | XOR | CP | |
| | K-15 | = | K-16 | XOR | K-10 | XOR | K-9 | XOR | KP | |
| Step 7 | D-7 | = | C-7 | XOR | E-7 | XOR | F-7 | XOR | 7P | |
| | L-15 | = | K-15 | XOR | M-15 | XOR | N-15 | XOR | 15P | |
| Step 8 | D-6 | = | D-7 | XOR | D-8 | XOR | D-1 | XOR | DP | |
| | L-14 | = | L-15 | XOR | L-9 | XOR | L-16 | XOR | LP | |
| Step 9 | 6P | = | D-5 | XOR | E-6 | XOR | F-6 | XOR | G-6 | |
| | 14P | = | L-14 | XOR | M-14 | XOR | N-14 | XOR | O-14 | |

Figure 14A

Chapter Table 1400

| Paragraph | Group 1 | Group 2 | Spare |
|---|---|---|---|
| 1 | A C E G | B D F H | I J |
| 2 | C E G I | D F H J | A B |
| 3 | G A I E | H B J F | C D |
| 4 | A I G C | B J H D | E F |
| 5 | E A C I | F B D J | G H |

Figure 14B

Singly Spared Table 1402

| Sparing Version | Group 1 | Group 2 | Spare |
|---|---|---|---|
| 1 | I C E G | B D F H | J |
| 2 | C E G I | D F H J | B |
| 3 | G C I E | H B J F | D |
| 4 | E I G C | B J H D | F |
| 5 | E G C I | D F H J | H |

Figure 14C

Singly Spared Paired Table 1404

| Paragraph | Group 1 | Group 2 | Spare |
|---|---|---|---|
| 1 | I C E G | J D F H | |
| 2 | C E G I | D F H J | |
| 3 | G C I E | H D J F | |
| 4 | E I G C | F J H D | |
| 5 | E G C I | F H D J | |

Figure 14D

Doubly Spared Chapter Table 1406

| Paragraph | Group 1 | Group 2 | Spare |
|---|---|---|---|
| 1 | I J E G | B D F H | |
| 2 | B E G I | D F H J | |
| 3 | G D I E | H B J F | |
| 4 | E I G F | B J H D | |
| 5 | E G H I | F B D J | |

Steps for Sparing in a Data Grid
1500

Figure 16

Utilization Chart 1600

| RAID-0 1602 | RAID-1-2 1604 | RAID-1-3 1606 | RAID-5 1608 | RAID-6 1610 |
|---|---|---|---|---|
| Data 1 | Data 1 | Data 1 | Data 1 | Data 1 |
| Data 2 | Data 2 | Data 2 | Data 2 | Data 2 |
| Data 3 | Data 3 | Data 3 | Data 3 | Data 3 |
| Data 4 | Data 4 | Data 4 | Data 4 | Data 4 |
| Data 5 | Data 5 | Data 5 | Data 5 | Data 5 |
| Data 6 | Data 6 | Data 6 | Data 6 | Data 6 |
| Data 7 | Data 7 | Data 7 | Data 7 | Data 7 |
| Data 8 | Data 8 | Data 8 | Data 8 | Data 8 |
| Data 9 | Data 9 | Data 9 | Data 9 | Data 9 |
| Data 10 | Data 10 | Data 10 | Data 10 | Data 10 |
| Data 11 | Data 11 | MData 10 | Data 11 | Data 11 |
| Data 12 | Data 12 | MData 9 | Data 12 | Data 12 |
| Data 13 | Data 13 | MData 8 | Data 13 | Data 13 |
| Data 14 | Data 14 | MData 7 | Data 14 | Data 14 |
| Data 15 | Data 15 | MData 6 | Data 15 | Data 15 |
| Data 16 | MData 15 | MData 5 | Data 16 | Data 16 |
| Data 17 | MData 14 | MData 4 | Data 17 | Data 17 |
| Data 18 | MData 13 | MData 3 | Data 18 | Data 18 |
| Data 19 | MData 12 | MData 2 | Data 19 | Data 19 |
| Data 20 | MData 11 | MData 1 | Data 20 | Data 20 |
| Data 21 | MData 10 | MData 10' | Data 21 | VP 17-20 |
| Data 22 | MData 9 | MData 9' | Data 22 | VP 13-16 |
| Data 23 | MData 8 | MData 8' | Data 23 | VP 9-12 |
| Data 24 | MData 7 | MData 7' | Data 24 | VP 5-8 |
| Data 25 | MData 6 | MData 6' | RP 21-24 | VP 1-4 |
| Data 26 | MData 5 | MData 5' | RP 17-20 | RP 17-20 |
| Data 27 | MData 4 | MData 4' | RP 13-16 | RP 13-16 |
| Data 28 | MData 3 | MData 3' | RP 9-12 | RP 9-12 |
| Data 29 | MData 2 | MData 2' | RP 5-8 | RP 5-8 |
| Data 30 | MData 1 | MData 1' | RP 1-4 | RP 1-4 |

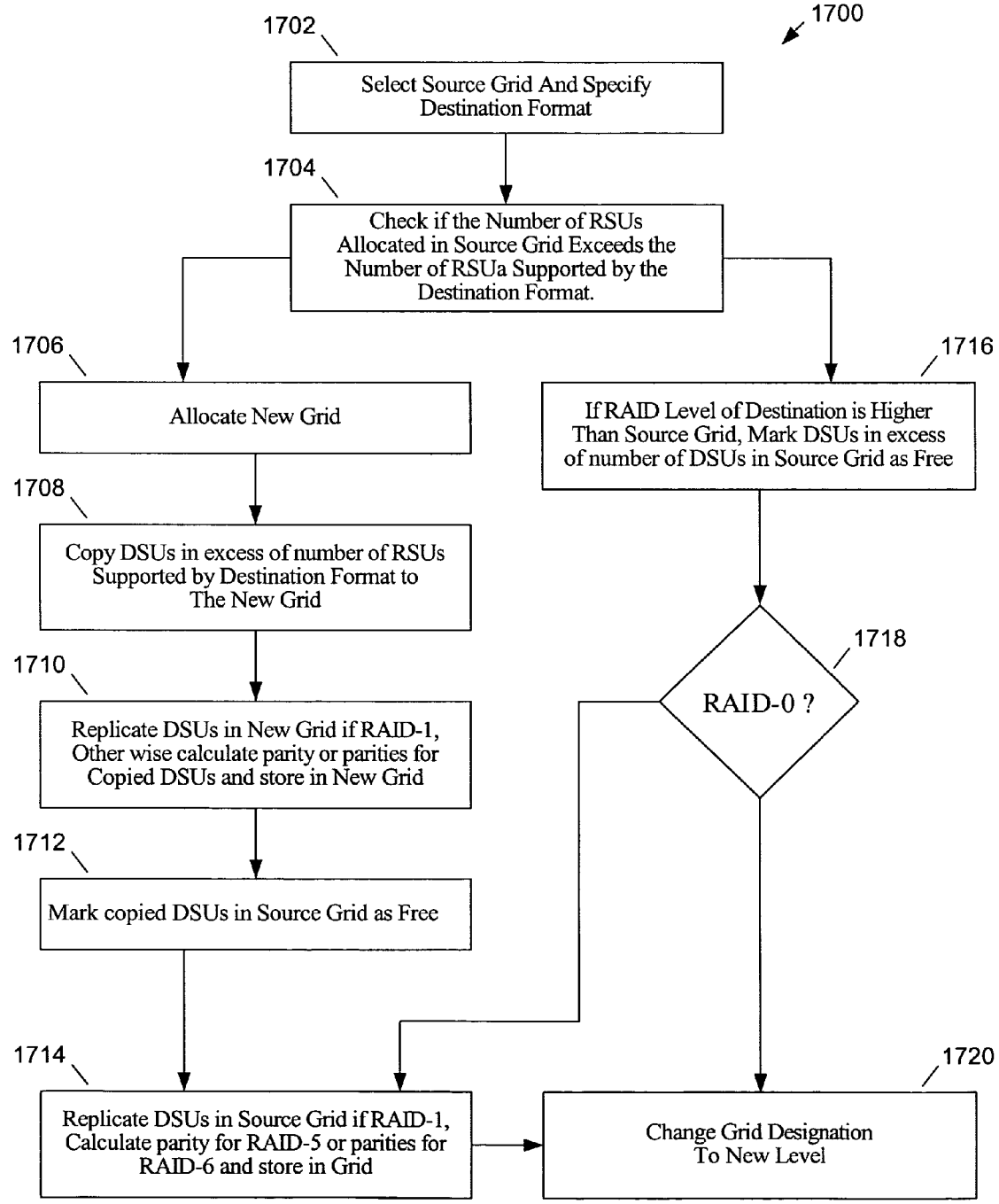

Steps to Configure a system to use a Data Grid 1800

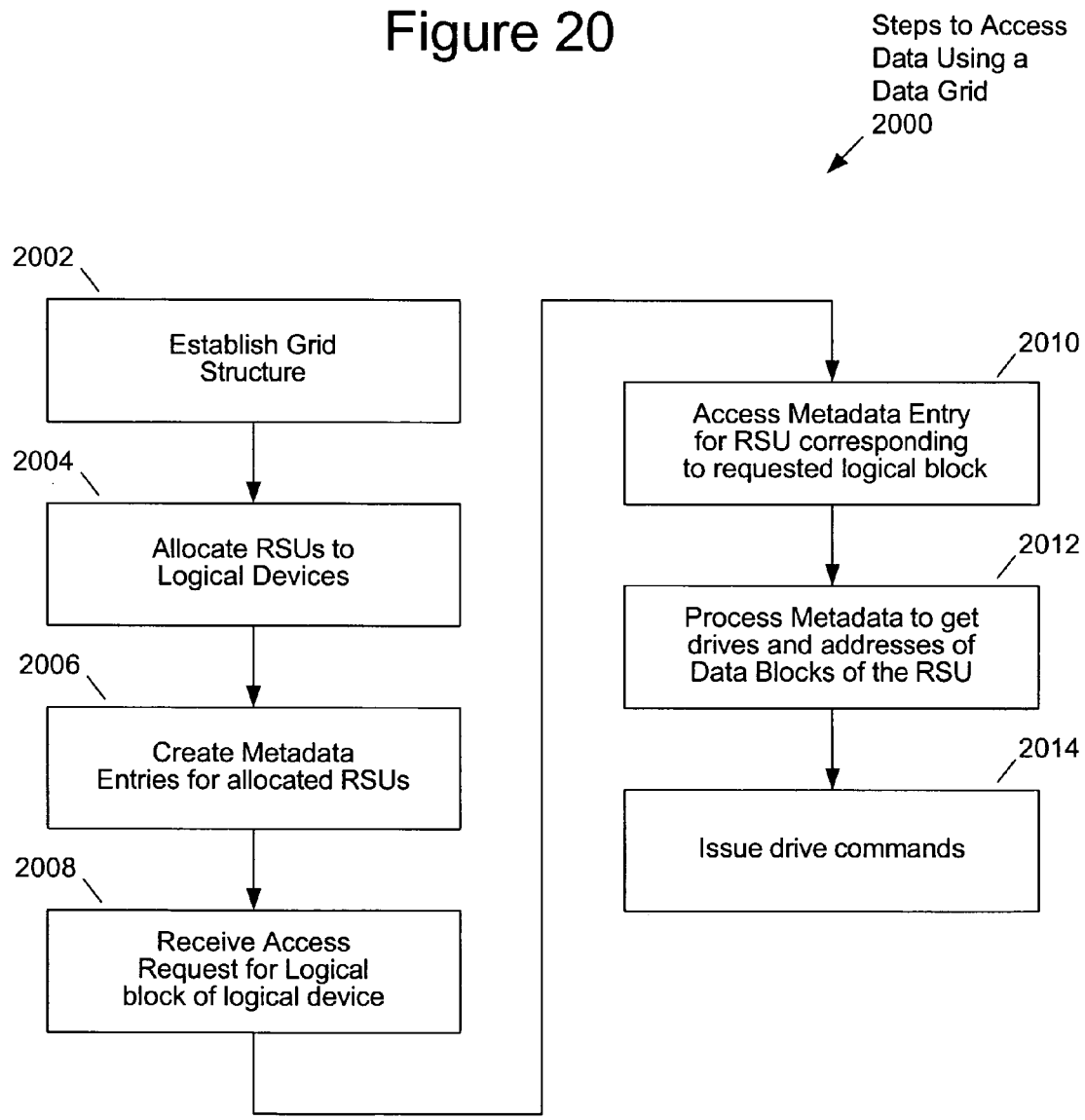

STORAGE MEDIA DATA STRUCTURE SYSTEM AND METHOD

BACKGROUND OF THE INVENTION a. Field of the Invention

The present invention pertains generally to storage of data and more specifically to organization and management of data in fault tolerant data storage systems.

b. Description of the Background

Fault tolerant data storage systems may store data across a plurality of disc drives and may include duplicate data, parity or other information that may be employed to reconstruct data if a drive fails.

Data storage systems may employ physical addressing or virtual addressing methods. In physical addressing, a file address specifies a physical address in the storage system. In virtual addressing, a file address is an address applied to a lookup table or other metadata structure to provide an actual physical address by providing an association of the virtual file address with the physical address.

Physical addressing and virtual addressing methods have both benefits and disadvantages. For example, physically mapped systems do not require the overhead of a lookup table or other data structure, but do not allow allocation of files such that access may be more evenly distributed across a number of drives for improved performance. Similarly, virtual mapped systems may be remapped to provide higher performance, but at the expense of maintaining a more complex address table.

Data storage systems may store data in various formats including various RAID (redundant array of independent discs) levels and may support a plurality of formats simultaneously. Differing RAID levels utilize different amounts of disk space to store a file of a predetermined size. This can result in increased complexity in allocating disc space to files and in lookup table overhead and execution time in accessing files. Conversion of files from a first storage format to a second storage format may require additional complexity in allocation routines and may result in fragmentation of allocated disc space.

SUMMARY OF THE INVENTION

The present invention provides a flexible pre-defined grid architecture as a basis for a virtual mapped storage systems. A plurality of like-sized grids are defined within a storage array. Columns in the grid correspond to independent data storage domains and rows correspond to data blocks at the same address in each domain. A plurality of sparing versions are applied to grids to define capacity grids. A data/parity organization specifies data blocks within each grid as containing user data, mirror data, or parity data. A plurality of different organizations are provided wherein each organization version corresponds to a data storage format, such as a RAID level, for example, allowing simultaneous support of different storage formats while providing simple allocation overhead. Data/parity organizations may employ packed parity wherein data is stored in a first portion of the grid and parity or mirror data is stored in a second portion of the grid, providing higher data access rates than if data and parity are distributed in a uniform manner. The present invention furnishes a data storage format and method that provides a reduced overhead method for storing data in a plurality of formats and converting data between storage formats than if only physical or virtual addressing were employed.

The present invention may therefore comprise a method of storing data in a data storage system comprising: defining a plurality of arrays of equal capacity data storage blocks within the data storage system, each array having a plurality of rows and a plurality of columns such that each column of the plurality of columns corresponds to a separate storage domain of a plurality of storage domains in the data storage system and each row of the plurality of rows corresponds to a plurality of data storage blocks with one data storage block of the plurality of storage blocks from each storage domain of the plurality of storage domains at the same logical address, the plurality of rows having a plurality of contiguous data storage blocks in each separate storage domain; creating metadata that defines the members of each array and their precise relationship and the particular grid system used; and accessing one data storage unit of a plurality of data storage units using the metadata.

Embodiments of the present invention may further comprise a data storage grid for storing data in a data storage system comprising: an array of equal capacity data storage blocks defined within the data storage system having a plurality of rows and a plurality of columns such that each column of the plurality of columns corresponds to a separate storage domain of a plurality of storage domains in the data storage system and each row of the plurality of rows corresponds to a plurality of data storage blocks, such that one storage block from each column of the plurality of columns has the same logical address, the plurality of rows having a plurality of contiguous data storage blocks in each domain; blocks specified as containing user data, blocks specified as containing mirror data and blocks specified as containing parity data for a given RAID organization; and a pointer that identifies at least one data storage unit and any associated redundancy.

Embodiments of the present invention may further comprise a data storage grid for storing data in a data storage system comprising: an array of equal capacity data storage blocks within the data storage system having a plurality of rows and a plurality of columns such that each column of the plurality of columns corresponds to a separate storage domain of a plurality of storage domains in the data storage system and each row of the plurality of rows corresponds to a plurality of data storage blocks, such that one storage block from each column of the plurality of columns has the same logical address, and the plurality of rows having a plurality of contiguous data storage blocks in each domain, and such that a first row of the array of data storage blocks is aligned to a base address in the data storage system that is multiple of the number of rows in the array multiplied by the capacity of the data storage blocks; a plurality of data storage units defined in the array such that each data storage unit of the plurality of data storage units has at least two data storage blocks in different columns of the array; and a pointer that identifies each data storage unit of the plurality of data storage units.

The present invention may further comprise a method of storing data in a data storage system comprising: defining an array of equal capacity data storage blocks within the data storage system having a plurality of rows and a plurality of columns such that each column of the plurality of columns corresponds to a separate storage domain of a plurality of storage domains in the data storage system and each row of the plurality of rows corresponds to a plurality of data storage blocks, such that one storage block of the plurality of storage blocks from each column of the plurality of columns has the same logical address, and the plurality of rows having a plurality of contiguous data storage blocks in each separate storage domain; aligning rows of the array of data storage blocks such that the logical block address of the first block in the row is a multiple of the height of each row; assigning a pointer that specifies each data storage unit of a plurality of data storage units; accessing at least one data storage unit of the plurality of data storage units using the pointer.

BRIEF DESCRIPTION OF THE DRAWINGS

In the drawings,

FIG. 3 depicts a sparing table for one embodiment of a data storage grid.

FIG. 5A depicts a single row RAID-0 capacity grid.

FIG. 5B depicts a two row RAID-0 capacity grid.

FIG. 5C depicts a five row RAID-0 capacity grid.

FIG. 6A depicts a single row RAID-1 capacity grid.

FIG. 6B depicts a two row RAID-1 capacity grid.

FIG. 6C depicts a five row RAID-1 capacity grid.

FIGS. 9A–9C depicts constrained RSU allocation.

FIG. 10A depicts a RAID-6 capacity grid.

FIG. 10B depicts a RAID-6 DSU/Parity Map.

FIG. 11 illustrates how RAID-6 data may be reconstructed following the simultaneous failure of two drives FIG. 12A depicts a chapter table like that shown in FIG. 4.

FIG. 12 illustrates calculations performed to regenerate data from failed drives

FIGS. 14A–14D illustrate data storage using spare data blocks.

FIG. 16 depicts grid utilization maps for a plurality of RAID levels.

FIG. 17 depicts steps performed to convert a grid from a first RAID level to another RAID level.

FIG. 20 depicts steps employed to access data in a storage system employing data storage grids.

DETAILED DESCRIPTION OF THE INVENTION

Figure 1:
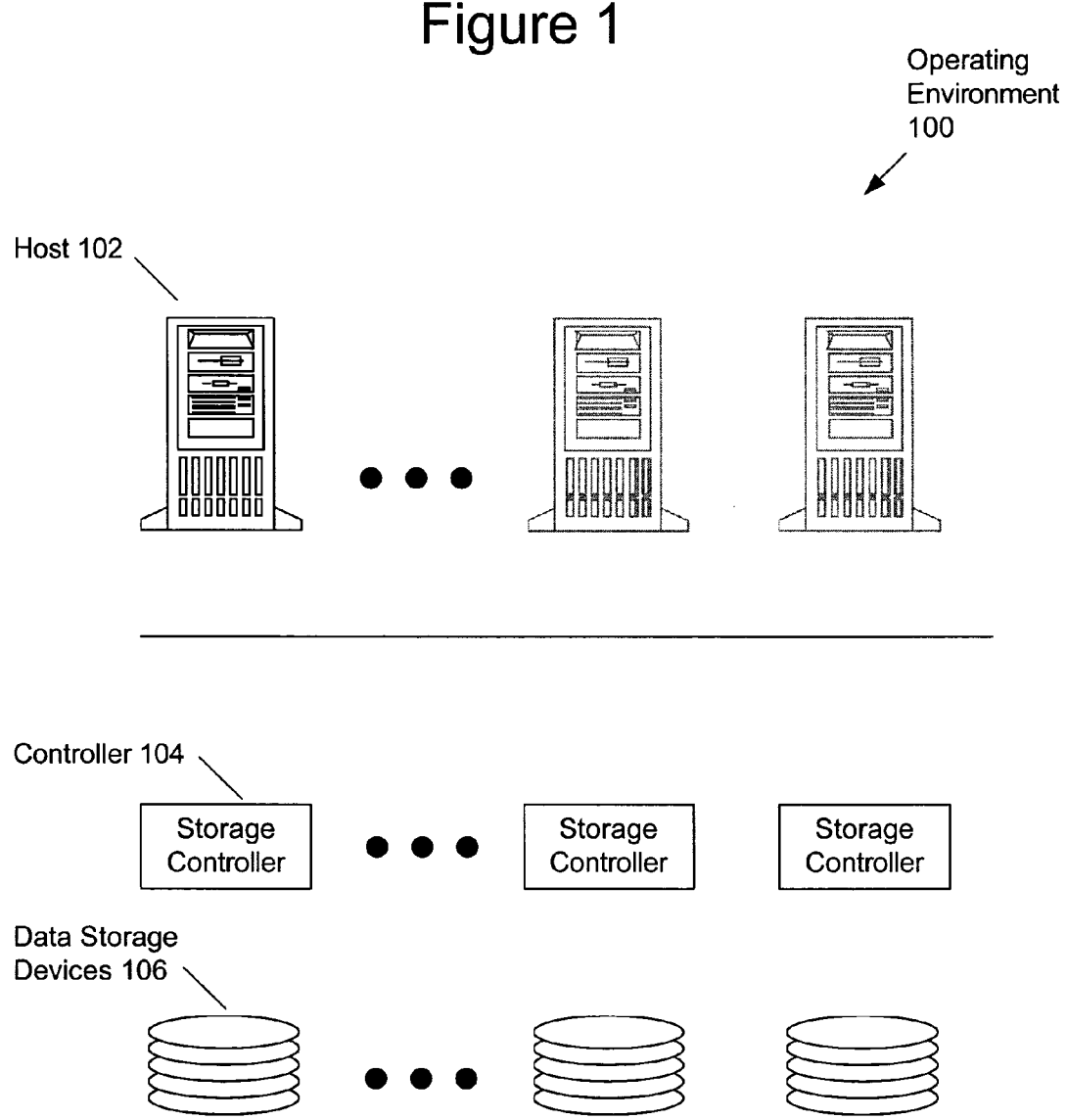
FIG. 1 depicts an operating environment of embodiments of the present invention.

Embodiments of the present invention may be employed in various storage architectures and operating environments. These environments include storage arrays and may include associated host systems, interface controllers, disc controllers, and arrays of storage media. FIG. 1 depicts an operating environment 100 of embodiments of the present invention. One or more hosts 102 are coupled to one or more storage controllers 104 that provide access to a plurality of data storage devices 106. A plurality of arrays of data storage devices may be employed. Data storage devices may comprise disc drives, optical memories, semiconductor memories, or any other devices that store data. Computer program code operating in one or more host systems, storage controllers, interface controllers (not depicted) and/or data storage devices serves to implement the data structure system and method of embodiments of the present invention. Each data storage device may be considered a failure domain and, as shall be described in detail in following examples, embodiments of the present invention provide efficient redundant data storage architectures that allow data retention in the event of one or more storage device failures. Embodiments of the present invention employ a data storage grid architecture mapped across a plurality of data storage devices. The following descriptions employ disc drives, however other storage media may be employed.

Figure 2:
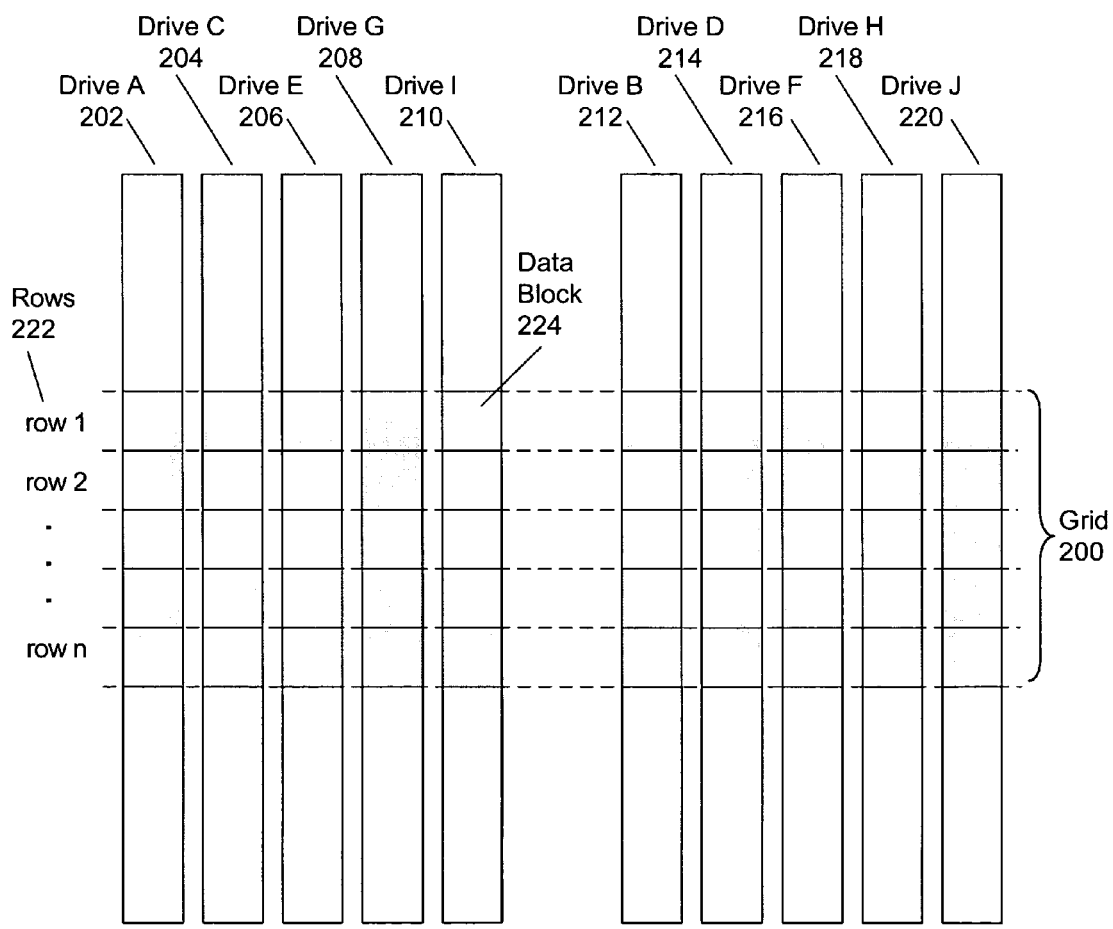
FIG. 2 depicts a data storage sheet.

FIG. 2 depicts a data storage sheet. The data storage sheet may be viewed as a two dimensional array of equal sized data blocks. Columns in the array correspond to disc drives and rows correspond to data blocks starting at the same logical block address in each drive. In FIG. 2, data storage sheet 200 comprises a plurality of rows 222 that intersect drives 202, 204, 206, 208, 210, 212, 214, 216, 218, 220 with a data block defined at each intersection. For example, data block 224 is defined at the intersection of row 1 and drive 210. Data blocks in a sheet are of equal size (storage capacity) but are not limited to a particular size. The size of a data block may be specified when configuring a storage system and may reflect the size (storage capacity) of drives in the system, user applications, controller hardware and software, and other factors. Rows 222 are contiguous in that there is no undefined storage space between rows of the sheet. The starting address of the first row in the sheet serves as the base address for the sheet and sheets may be defined such that the base address is aligned to an address that is a multiple of the size of a data storage block multiplied by the number of rows in a sheet. Sheets may be numbered and the storage capacity contained in a sheet may be allocated using a pointer to the sheet. A pointer table may associate a pointer with a sheet number, providing easy virtualization and reducing metadata overhead. Pluralities of sheets are defined that occupy a portion of the available storage capacity of the drives in the array. This collection of sheets is referred to as a book. The data storage sheet may be considered a base structure to which sparing may be applied and on top of which data/parity maps are implemented for each storage format supported, such as RAID levels, for example. Sparing refers to the designation of data blocks in the sheet as spare data blocks that may be employed to contain regenerated or copied data in the event of failure of other drives in the system. The amount of spare data blocks may correspond to the capacity of one or more drives.

FIG. 3 depicts a sparing table for one embodiment of a data storage grid. This embodiment employs 10 disc drives with a spare capacity equal to two drives that is distributed across all 10 drives. This is in contrast to dedicated sparing where spare capacity exists only on the spare drive or drives. The advantage of distributed sparing as shown in FIG. 3 is that ten drives can be simultaneously accessing data in contrast to eight drives in dedicated sparing, resulting in higher system performance. In FIG. 3 sparing table 300 contains indices drives 302 and sparing versions 304. Drives 302 correspond to those depicted in FIG. 2. The designation of which drives provide spare data blocks (as indicated by the letter "s") and which drives provide user data or parity data blocks (as indicated by the letter "u") changes for each sparing version in a regular and predetermined fashion. This allows user data, parity, and spare data blocks to be distributed across all drives in an even manner. In implementations where two or more drives provide spare capacity for each sparing version, drives may be organized into groups and pairs. In table 300, drives A&B, C&D, E&F, G&H, and I&J form pairs and sparing is allocated such that data blocks contained in the two drives of the pair have the same designation (spare or user data/parity) for each version of the table. Drives may also be organized into groups. In table 300, group 1 (306) contains drives A, C, E, G, and I and group 2 (308) contains drives B, D, F, H and J. Pairing may be employed for RAID-1 data formats such that one member of the pair contains data and the other member of the pair contains mirror data. Grouping may be employed for RAID-5 data formats such that data may be stored in one group and parity is stored in another group. As such, pairing and grouping of drives may be employed when defining fault tolerant data storage formats as is described later in greater detail. The pairing and grouping of FIG. 3 is exemplary and there is no constraint as to which drives form pairs or groups.

Various boundaries may demark where sparing versions change. For example, the sparing version may change for each row of a sheet, for each sheet, or for a group of rows, or a group of sheets. Sparing table 300 may be viewed as a circular table that repetitively cycles through all versions. For example, a sixth row, sixth sheet, or sixth group of sheets may employ the same sparing as a first row, first sheet, or first group of sheets using the table depicted in FIG. 3. Table 300 may be modified to support other sheet organizations to reflect the number of drives and spare capacity. Other data structures, other drive or spare ordering, or software program code may be employed to achieve the function of table 300. The sparing method illustrated in FIG. 3 allows sparing to be implemented in a simple regular manner and the sparing used for any particular row, sheet, or groups of sheets may be determined by dividing a base address of the row, sheet, or group of sheets by the storage capacity of the row, sheet, or group of sheets and then dividing the result by the number of rows in the sparing table and using the remainder as an index into the sparing table. A group of one or more consecutive rows (and that may comprise one or more sheets) that use one entry in the sparing table is termed a paragraph. A group of consecutive paragraphs that use all sparing versions once, starting with the first sparing version, is termed a chapter.

Figures 4A, 4B:
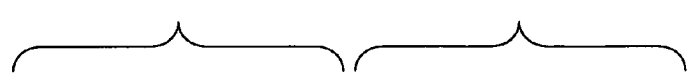
FIG. 4A depicts a storage chapter table.
FIG. 4B depicts a capacity grid.

FIG. 4A depicts a storage chapter table. As noted above, a chapter is a plurality of paragraphs (rows or sheets) to which all sparing versions have been consecutively applied. Chapter table 400 contains paragraphs 402 and drives designated as group 1 (404), group 2 (406), or spare 408. Letters in each row may represent a single data block on that drive, or may represent a plurality of contiguous storage blocks, called a super block, on that drive. For example, if the paragraph demarcation is a sheet, and the sheet comprises a predefined number of rows, then the number of data blocks in a super block is equal to the number of rows in the sheet. It may be observed from chapter table 400 that a uniform amount of user storage capacity (i.e, excluding spares) exists in each paragraph. The group of user data blocks (that may be used for data or parity) in the plurality of rows of a sheet to which sparing has been applied is termed a capacity grid. In other words, a sheet organization is defined for a plurality of sheets, sparing (if any) is applied to the sheets, resulting in a plurality of capacity grids. FIG. 4B depicts a capacity grid. Capacity grid 410 is a grid that may be produced by defining sheets having five rows that are spared at a sheet boundary (i.e. the paragraph comprises five rows) where the first sparing version is employed. The drives providing user data in each group are the same within each row of the paragraph. A capacity grid may be viewed as the available storage of a sheet to which sparing, pairing, and grouping are transparently applied. The capacity grid 410 contains 2 groups, group 1 (412) comprising drives A, C, E, and G and group 2 (414) comprising drives B, D, F, and H. The data blocks in a row of the capacity grid that belong to one group (four data blocks in this example) are termed a data storage unit (DSU) and as such ten DSUs are depicted in capacity grid 410. DSUs may be considered as belonging to group 1 or group 2. In some embodiments of the present invention, all DSUs in a capacity grid are allocated to the same logical device, reducing virtualization metadata overhead.

The following figures illustrate data storage format embodiments of the present invention that are applied to capacity grids. Various sheet sizes may be defined to reflect a desired number of DSUs allocated to each logical unit, the storage format (such as RAID levels, for example) and the coexistence of, and conversion between, multiple data storage formats.

FIGS. 5A–5C depict capacity grids employing a RAID-0 data storage format. FIG. 5A depicts a single row RAID-0 capacity grid. In FIG. 5A, grid 500 is a single row capacity grid having eight data blocks, with a first DSU (group 1) containing Data A-1, Data A-2, Data A-3, and Data A-4 (collectively referred to as "Data A") and a second DSU (group 2) containing Data B-1, Data B-2, Data B-3, and Data B-4 (referred to as "Data B"). FIG. 5B depicts a two row RAID-0 capacity grid. In FIG. 5B, grid 502 has two rows and four DSUs containing Data A, Data B, Data C, and Data D. FIG. 5C depicts a five row RAID-0 capacity grid. In FIG. 5C, grid 504 has five rows containing Data A–J. From the grids depicted in FIGS. 5A–5C, it may be observed that RAID-0 grids may be of any number of rows. As previously noted, the DSUs of a capacity grid can be allocated to the same logical device. Such allocation may be defined such that data sets are consecutively placed in groups and rows of the capacity grid, allowing the disc drives in the array to access consecutive data blocks when three or more DSUs are written or read.

FIGS. 6A–6C depict capacity grids employing a RAID-1 data storage format. FIG. 6A depicts a single row RAID-1 capacity grid. Grid 600 is a single row capacity grid having eight data blocks with a first DSU (group 1) containing Data A-1, Data A-2, Data A-3, and Data A-4 (collectively referred to as "Data A") and a second DSU (group 2) also containing Data A. The data in the second DSU mirrors the data in the first DSU. As described relative to FIGS. 3 and 4, the drive containing Data A-1 in the first DSU may be considered to form a pair with the drive containing Data A-1 in the second DSU. Since Data A exists in DSUs of two groups, data contained in a failed drive of one group may be accessed in the paired drive of the other group. FIG. 6B depicts a two row RAID-1 capacity grid. Grid 602 comprises two rows and contains Data A and Data B. As may be observed from grid 602, Data A is in a first DSU (group 1) in the first row of the grid and is also in a second DSU (group 2) in the second row of the grid. Similarly Data B is in a second DSU in the first row and is in a first DSU in the second row, providing access to a paired drive in the event of a drive failure. Grid 602 has the advantage that eight data blocks may be read simultaneously as compared to four for grid 600 such that grids that are multiples of two may be desirable for higher performing RAID 1 formats. FIG. 6C depicts a five row RAID-1 capacity grid. Grid 604 contains five rows, illustrating that odd numbers of rows greater than one can be supported and that read performance is similar to multiples of two rows with the exception of one row (the third row in grid 604) where four data blocks would be read.

Figure 7:
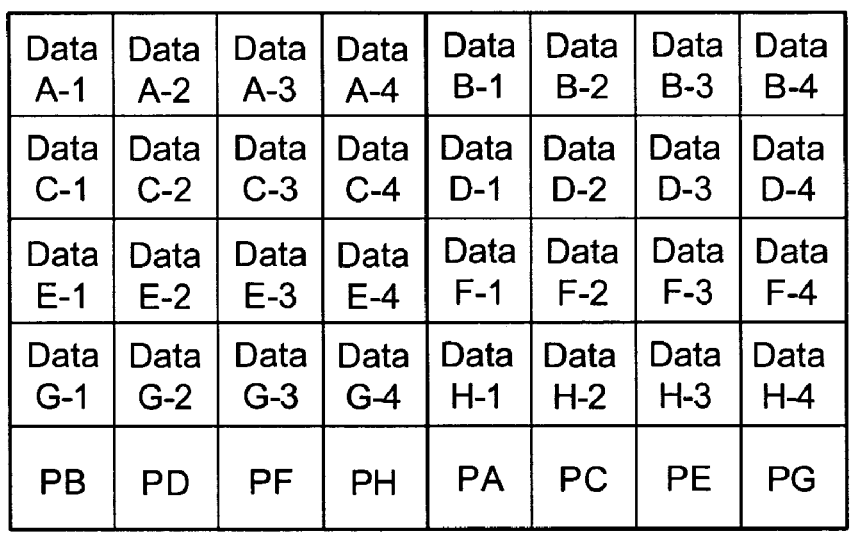
FIG. 7 depicts a RAID-5 capacity grid.

FIG. 7 depicts a RAID-5 capacity grid. Grid 700 comprises five rows with four rows containing data and one row containing parity. This is a "four plus one" RAID-5 arrangement where four data blocks are employed to calculate one parity block. As may be observed from grid 700, parity for data sets in group 1 DSUs is stored in a group 2 DSU and parity for data sets in group 2 DSUs is stored in a group 1 DSU. From this arrangement, if any one drive fails, data blocks in the failed drive may be reconstructed by XORing (logically exclusive ORing) the other members of the DSU and the parity for that DSU. Parity contained in a failed drive is reconstructed by XORing the data set members. For example, if the drive containing Data A-3, Data C-3, Data E-3, Data G-3, and PF fails, XORing Data A-1, Data A-2, Data A-4, and PA reconstructs Data A-3. Similarly, XORing Data C-1, Data C-2, Data C-4, and PC reconstructs Data C-3. XORing Data E-1, Data E-2, Data E-4, and PE reconstructs Data E-3. XORing Data G-1, Data G-2, Data G-4, and PG reconstructs Data A-3. XORing Data F-1, Data F-2, Data F-3, and Data F-4 reconstructs PF. The reconstructed data may then be stored on a spare drive. It also may be observed in FIG. 7 that in contrast to many RAID 5 implementations where data and parity are stored in each row, embodiments of the present invention provide a "packed parity" data format where parity is stored in a latter portion of the grid, allowing the "front end" on the grid to solely contain user data, allowing data to be sequentially accessed, providing higher read performance. With the "four plus one" RAID-5 format, it also may be observed that grids that are multiples of five rows efficiently store data and parity. For example, a 10 row RAID-5 grid may comprise user data in the first eight rows and parity in the last two rows.

Figure 8A:
FIGS. 8A–8C depict RAID-0, RAID-1, and RAID-5 grids and illustrate how a sheet definition of a predetermined number of rows may be employed to support multiple storage formats.
Figure 8B:
Figure 8C:

FIGS. 8A–8C depict RAID-0, RAID-1, and RAID-5 grids and illustrate how a sheet definition of a predetermined number of rows may be employed to support multiple storage formats. FIG. 8A depicts a five row RAID-0 grid. FIG. 8B depicts a five row RAID-1 grid. FIG. 8C depicts a five row RAID-5 grid. Grid 800 is a RAID-0 grid, grid 802 is a RAID-1 grid, and grid 804 is RAID-5 grid, all shown as five rows. As may be observed from the grids in FIGS. 8A–8C, grids contain a different amount of user data depending on the storage format. For example, grid 800 contains 10 DSUs of user data, grid 802 contains five DSUs of user data, and grid 804 contains eight DSUs of user data. A DSU and the corresponding mirror data DSU or parity block is termed an RSU (reliable storage unit) that provides fault tolerance. It is observed from FIG. 8 that RAID-1 grids may be converted to RAID-0 or RAID-5 with out requiring allocation of additional grids to provide additional storage capacity since RAID-1 provides 5 DSUs whereas RAID-0 and RAID-5 provide ten DSUs and eight DSUs respectively. If a RAID format is converted to another RAID format with fewer DSUs per grid, additional grid or grids are allocated.

Alternatively, the number of DSUs allocated in a grid may be constrained such that formats may be converted without allocating additional grids. FIGS. 9A–9C depict constrained RSU allocation. FIG. 9A depicts a five row RAID-0 grid. FIG. 9B depicts a five row RAID-1 grid. FIG. 9C depicts a five row RAID-5 grid. Grid 900 is a RAID-0 grid, grid 902 is a RAID-1 grid, and grid 904 is a RAID-5 grid, all of which provide five DSUs. The grids of FIG. 9 are exemplary and implementations of constrained allocation may use a larger number of rows, where the storage format and packed parity can provide a larger number of contiguous datasets.

FIG. 10A depicts a RAID-6 capacity grid. RAID-6 is similar to RAID-5 in that a row parity value is calculated for each DSU but also includes a vertical parity that employs XORing data blocks from different DSUs. Grid 1000 comprises eight rows containing sixteen data sets and four rows containing parity. Data sets (four data blocks each) are represented by the letters A through P.

FIG. 10B depicts a RAID-6 DSU/Parity Map. One embodiment of RAID-6 parity calculations may be understood through RAID-6 DSU/Parity Map 1002 shown in FIG. 10B. Whereas grid 1000 depicts data sets and parity rows, DSU/Parity map 1002 shows data blocks 1004 that contain user data and parity blocks 1006 that contain row or vertical parity values. Each data block contains a letter-number index pair. The letter index designates which data blocks are employed to calculate a row parity value and the number index designates which blocks are employed to calculate a vertical parity value. Data blocks having the same index are XOR'ed (logically exclusive OR'ed) to produce a parity value. For example, A-1, A-2, A-3 and A-4 are XORed to produce AP mid A-1, B-1, C-1 and D-1 are XORed to produce 1P. Each data block contributes to one row parity value and to one vertical parity value.

The row and vertical parities of this RAID-6 grid result in two rows of parity for each four rows of user data. Parity locations for the first four data rows and second four data rows are permuted to allow data regeneration following two drive failures. This results in a minimum RAID-6 grid size of twelve rows and as such, grids that are multiples of twelve rows provide efficient storage of RAID-6 data. The contents of DSU/Parity Map 1002 may be abbreviated as shown in grid contents 1008. DSU/Parity MAP 1002 defines how RAID-6 data may be stored in a capacity grid. The drives employed to store data or parity reflect the sparing version. RAID-6 formats of embodiments of the present invention allow recovery of data after simultaneous failure of two drives.

FIG. 11 illustrates how RAID-6 data may be reconstructed following the simultaneous failure of two drives. FIG. 11 depicts a Data/Parity Map indicating failed drives. Data/Parity Map 1100 is like that shown in FIG. 10 but includes arrows indicating failed drives 1102. The failed drives are both in the same group. Blocks in the left two columns comprise inaccessible blocks 1108 and cannot be read or written. Blocks in the right six columns comprise accessible blocks 1110 and can read or written. Cross-shaded blocks in FIG. 11 illustrate that block A-2 can be regenerated from blocks B-2, C-2, H-2, and 2P. Similarly, solid-shaded blocks illustrate that block I-10 can be regenerated from blocks J-10, K-10, P10, and 10P.

FIG. 12 illustrates calculations performed to regenerate data from failed drives. Reconstruction Calculation Example 1200 depicts steps that can be performed to regenerate data on the failed drives 1102 of FIG. 11. In FIG. 12, steps 1202 produce each of the regenerated blocks 1204 using calculations 1206. From FIG. 11 it is observed that there are a plurality of blocks in the failed drive that are single instances of a letter in the letter-number pair, or are a single instance of a number in a letter number pair, as exemplified by blocks A-2 and I-10. In step 1 of FIG. 12, blocks corresponding to single instances of letter or number indices in the failed drives are regenerated using the calculations shown. Once a block is regenerated, it can be used to calculate other block values. For example, block A-2 is regenerated in step 1 of FIG. 12 and then is employed to regenerate block A-1 in step 2. For each of the steps 2–9, a block regenerated in a previous step is employed to regenerate another block.

Restated, the steps shown in FIG. 12 employ regenerating data/parity sets with one data block contained on a failed drive first which then provides a regenerated data block to a data/parity set having two data blocks on failed drives. The calculations depict XOR operations and as such the order of the operands may be altered without changing the result. Calculations may be performed in any order within each step. The order in which regeneration calculation steps are performed may be determined by analyzing the instances of row and vertical indices of the data/parity map for blocks in the failed domains.

The regeneration example shown in FIGS. 11 and 12 corresponds to a worst-case regeneration scenario. Non-adjacent drives present less complex regeneration steps. The sparing methods of the present invention distribute the eight data blocks in a capacity grid row across ten drives. The chapter table depicted in FIG. 4 defines the distribution of blocks. The distribution varies for each paragraph, with each paragraph comprising one or more rows, or one or more sheets. Some embodiments of the present invention employ a paragraph size of two sheets.

The effect of distributing blocks across ten drives results in some capacity grids not employing data blocks on a failed drive. For single drive failures, 20% of the capacity grids are not affected since they do not use blocks from the failed drive. For affected grids following a single drive failure, regeneration of data for RAID-5 and RAID-6 grids comprises employing row parity values to calculate the inaccessible blocks and RAID-1 regeneration copies blocks from the paired drive.

If two drives fail, and the drives are drive pairs, one sparing version will result in capacity grids having no blocks contained on the failed drives. If the drives are not drive pairs, two sparing versions result in grids having only one failed drive.

Figure 13:
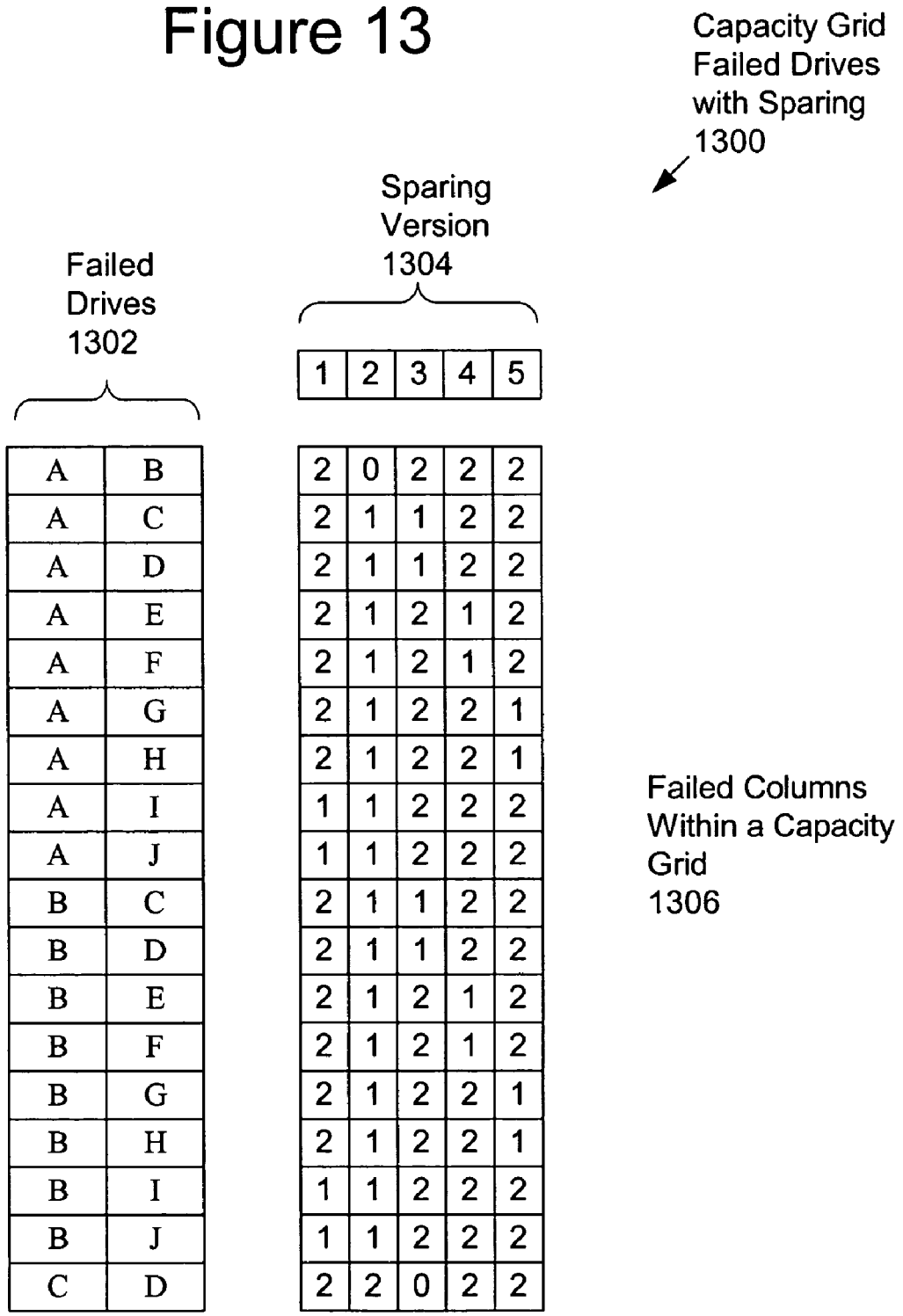
FIG. 13 depicts the number of failed columns in capacity grids of each sparing version when two drives fail.

FIG. 13 depicts the number of failed columns in capacity grids of each sparing version when two drives fail. For each pair of failed drives 1302, the number of failed columns 1306 is shown for each sparing version 1304. Not all permutations of drive failures are shown. From FIG. 13 it is observed that sparing methods of the present invention reduce the number of calculations required to regenerate data following drive failures.

FIGS. 14A–14D illustrate data storage using spare data blocks. Following a drive failure, copied or regenerated data may be stored in spare data blocks, allowing continued storage system operation. FIG. 14A depicts a chapter table 1400 like that shown in FIG. 4. FIG. 14B depicts a singly spared table 1302 depicting drive assignments after drive "A" has failed. It may be observed that for each row of the table, data blocks from a different drive are employed to store reconstructed or copied data blocks that contain the data values previously stored on drive A. In some embodiments, the drives employed to provide spare data blocks belong to the same group. This maintains the relationship of storing data sets in one group and storing parity or mirror data in another group. In storage formats such as RAID-1 where data blocks may be paired with mirror data blocks, it may be desirable to maintain drive pairs. In this embodiment, if a drive fails, data from the mirror drive is copied to both spare drives in each row (that also form a drive pair), maintaining the pair relationship, and the failed drive and corresponding pair drive are excluded from storing additional data. FIG. 14C depicts sparing with paired drives. Paired sparing is shown in singly spared paired table 1404 where drive A has failed and drive B, which is the pair of drive A, is excluded from storing other data. In each row of the modified paired table, a different drive pair replaces the A/B pair. In the first row of table 1404, drives I and J replace drives A and B, in the second row, drives G and H replace drives A and B, in the third row, drives E and F serve as the replacement pair, in the fourth row drives C and D serve as the replacement pair, and in the fifth row, no replacement is required since drives A and B were designated as spares. FIG. 14D depicts a doubly spared chapter table. Doubly spared table 1406 depicts drive assignments after drives A and C have failed. In rows one to three of table 1406, a first spare serves to contain the data of drive A and a second spare serves to contain the data of drive C. In the fourth row, drive C was designated as a spare and drive D replaces drive A. In the fifth row, drive A was designated as a spare and drive B replaces drive C. FIGS. 14A–14D serve to illustrate how distributed spares are employed to store copied or reconstructed data after the failure of one or two drives. The sparing examples shown in FIGS. 14A–14D allow a storage system to continue operating following the failure of up to two drives. RAID-6 row and vertical parities accommodate two simultaneous drives failures. If a third drive failure occurs, the system can operate in a reduced rate read mode, also called degraded mode, where data is regenerated as it is read.

Figure 15:
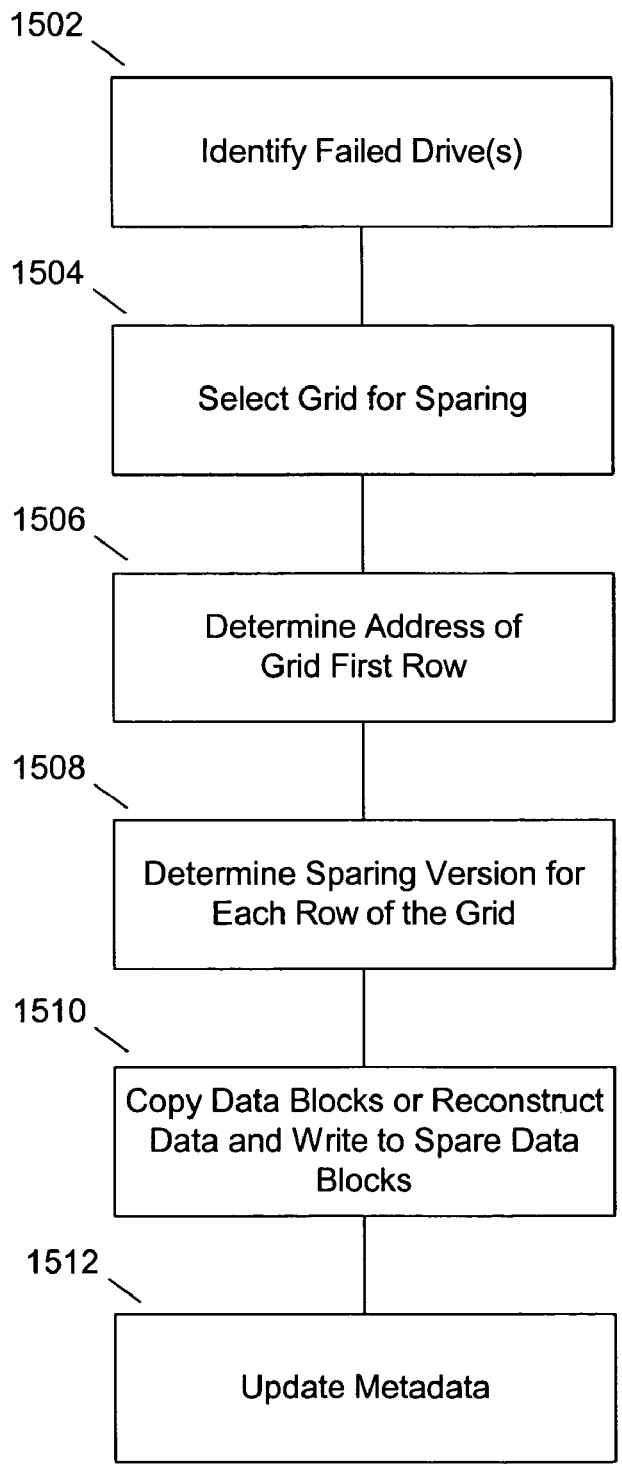
FIG. 15 depicts steps for sparing a data grid.

FIG. 15 depicts steps for sparing a data grid. Sparing refers to the copying or reconstruction of data and storing of the data to spare data blocks. At step 1502, a drive or drives that have failed are identified. At step 1504, a grid to be spared is selected. After a drive failure, grids containing more frequently accessed data, or grids using a particular storage format (such as RAID-1, for example) may be spared before other grids in the storage system are spared. At step 1506, a grid identifier, which may comprise a number, pointer, or other index, is used to determine the address of the first row of the grid. This may employ multiplying a grid number by the number of rows in each grid and adding an address offset, if any. Alternatively, a row number may be determined by multiplying the grid number by the number of rows in each grid. At step 1508, the row address of row number is applied to a sparing table to determine the sparing version of each row of the grid. As previously noted, a grid may employ a single version of sparing, or may employ more than one version depending on the paragraph size specified. At step 1510, a DSU/Parity map or equivalent structure corresponding to the grid storage format is accessed. From the DSU/Parity map, DSU and mirror data/parity sets are analyzed to identify sets with one data block contained on a failed drive. The data block corresponding to the failed drive is copied or reconstructed using row or vertical parity and is stored in a spare data block indicated by the sparing table for the corresponding row of the grid. The spare data block selected may be selected to be in the same group as the failed data block. If two drive failures have occurred, reconstructed data blocks may result some data sets that previously contained two data blocks on failed drives to then contain one data block on a failed drive, as is evidenced by the reconstruction calculation example of FIG. 11. Once all failed data blocks in the grid have been reconstructed and copied to spare data blocks indicated by the sparing table, metadata is updated in step 1512 to indicate that sparing for the grid has been completed. Grid examples shown in the preceding figures allow data retention after two simultaneous drive failures when RAID-6 storage formats are used. The RAID-5 formats also support sequential failure of any two drives when the grid is reconstructed between failures.

Grid utilization maps may be employed to illustrate various storage embodiments of the present invention and to show how stored data may be converted among formats. FIG. 16 depicts grid utilization maps for a plurality of RAID levels. Utilization chart 1600 depicts the contents of RAID-0, RAID-1, RAID-5, and RAID-6 grids. Each grid comprises 240 rows. Each entry in chart 1600 corresponds to eight rows of each grid. Data 1 in the chart refers to eight rows containing 16 data sets. As shown in FIG. 10B, eight rows of data sets result in two rows of row parity values (for RAID-5 and RAID-6) and two rows of vertical parity (RAID-6). As such, row parity for Data 1, Data 2, Data 3, and Data 4 are stored in an eight-row portion of the grid labeled as RP 1–4. Similarly, vertical parity for Data 1, Data 2, Data 3 and Data 4 are stored in an eight-row portion of the grid labeled as VP 1–4. For RAID-0 (1602) each entry of the grid contains user data, labeled Data 1–30. For RAID-1-2 (1604), fifteen entries contain user data, labeled Data 1–15, and fifteen entries contain mirror data, labeled MData 1–15. The mirror data contains the same data values as Data 1–15, but employs a different group to store each data set. For RAID-1-3 (1606) ten entries contain user data labeled Data 1–10, ten entries contain mirror data, labeled Mdata 1–10, and ten entries contain rotated mirror data labeled Mdata 1'–10'. For RAID-5 (1608), twenty-four entries contain user data, labeled as Data 1–24, and six entries contain row parity. For RAID-6 (1610), twenty entries contain user data, labeled as Data 1–20, five entries contain row parity, and five rows contain vertical parity. Chart 1600 illustrates a commonality of storage formats that provides simple conversion between formats. Different RAID formats may be employed depending upon utilization of the stored data. For example, files associated with transaction processing may be stored in a RAID-1 format when being updated and maybe stored in a RAID-5 or RAID-6 format after updates are completed.

Conversion from a RAID-0 grid to another RAID level may employ allocation of another grid. To convert the RAID-0 grid of FIG. 16 to RAID-1-2, Data 16–30 are written to a new grid, once in the format of the original sheet and once with data sets swapped in each group to create the mirror data. Data 16–30 in the original RAID-0 grid are marked as free and Data 1–15 are written to these locations with swapped data sets to provide mirror data. The designation of the grid is then changed to RAID-1. To convert the RAID-0 grid of FIG. 16 to RAID-5, Data 25–30 are written to a new grid and parity is calculated for each DSU and is stored in a corresponding entry in the new grid. Data 25–30 are then marked as free in the original RAID-0 grid. Parity values for Data 1–24 are calculated and stored in the corresponding entries and the grid designation is changed to RAID-5. To convert the RAID-0 grid of FIG. 16 to RAID-6, a new RAID-6 grid is allocated and Data 21–30 are written to a new grid as Data 1–10. Data 21–30 in the original grid may then be marked as free. Row and vertical parities are calculated for Data 1–20 in the original grid and are stored in the corresponding entries. Row and vertical parities are then calculated for Data 1–10 in the new grid. The designation of the original grid is then changed to RAID-6.

Conversion of a RAID-1 grid to another RAID level does not require allocation of a new sheet. To convert the RAID-1 grid of FIG. 16 to RAID-0, Data 16–30 are marked as free and the grid designation s changed to RAID-0. To convert to the RAID-1 grid of FIG. 16 to RAID-5, Data 16–24 are marked as free, parity for Data 1–15 is calculated and stored in corresponding entries, and the grid designation is changed to RAID-5. To convert the RAID-1 grid of FIG. 16 to RAID-6, Data 16–24 are marked as free and row and vertical parities are calculated and stored in the corresponding entries. The grid designation is then changed to RAID-6

Conversion of a RAID-5 grid to RAID-1-2 may employ allocation of a new grid if more data sets than are provided in the RAID-1-2 format have been allocated in the RAID-5 grid. To convert the RAID-5 grid of FIG. 16 to RAID-1-2, a new grid is allocated and Data 15–24 are copied to the new grid as user data and mirror data. Data 15–24 and Parity 1–24 are marked as free in the original grid. Data 1–15 are copied in mirror data format to the free entries. The grid designation is then changed to RAID-1-2. Conversion of the RAID-5 grid of FIG. 15 to RAID-6 employs allocation of a new grid. Data 21–24 are copied to the new grid. Parity 21–24 can be copied to the new grid or be recalculated. Vertical parity for Data 21–24 is calculated and stored in the new grid. Data 21–24 and Parity 21–24 in the original grid are marked as free. Vertical parities for Data 1–20 are calculated and stored in the corresponding entries. The grid designation is then changed to RAID-6.

Formats other than RAID-0 may be converted to RAID-0 simply by changing the RAID level designation of the sheet. In RAID-5 or RAID-6 formats where not all data sets in an entry are written, or when the number of data sets written in RAID-6 is not a multiple of eight, existing data is employed to calculate the parities. Metadata employed to manage a storage system includes the number of RSUs per grid for each storage format supported. Conversions of individual RSUs are possible if the corresponding parity DSUs are free or made free. Keeping track of the metadata state for a sheet with mixed parity would require a more complex metadata structure.

FIG. 17 depicts steps performed to convert a grid from a first RAID level to another RAID level. At step 1702, the grid to be converted (termed the source grid), and the format to which the grid is to be converted (called the destination format) are selected or otherwise specified. At step 1704, a check is performed to determine if the number of RSUs allocated in the source grid exceeds the number of RSUs provided by the destination format. If the result of the check is that there are more allocated RSUs in the source grid than supported by the destination format, processing continues at step 1706 where a new grid is allocated. At step 1708, DSUs that correspond to RSUs that are in excess of the number of RSUs supported by the destination format are copied to the new grid, starting with the first DSU. At step 1710, DSUs are copied in step 1708 are copied within the new grid to another group to provide RAID-1 mirror data if the destination format is RAID-1. Otherwise, row parity is calculated and stored. If the destination format is RAID-6, vertical parity is also calculated and stored. The DSU location where data, mirror data, row parity, or vertical parity are stored is specified by the DSU/Parity map for the destination format. At step 1712, DSUs in the source grid that were copied to the new grid are marked as free. At step 1714, DSUs in the source grid are copied within the source grid to another group to provide RAID-1 mirror data if the destination format is RAID-1. Otherwise, row parity is calculated and stored. If the destination format is RAID-6, vertical parity is also calculated and stored. The DSU location where data, mirror data, row parity, or vertical parity are stored is specified by the DSU/Parity map for the destination format. At step 1720, metadata is updated to change the designation of the source grid to that of the destination format. If the check performed in step 1704 determines that the number of RSUs in the source grid is less than or equal to the number of RSUs provided by the destination format, processing continues at step 1716. At step 1716, DSUs in excess of the number of DSUs supported by the destination format are marked as free. At step 1718 a check is performed to determine if the destination format is RAID-0. If the destination format is not RAID-0, processing continues at step 1714 where DSUs in the source grid are copied within the source grid to another group to provide RAID-1 mirror data if the destination format is RAID-1. Otherwise, row parity is calculated and stored. If the destination format is RAID-6, vertical parity is also calculated and stored. The DSU location where data, mirror data, row parity, or vertical parity are stored is specified by the DSU/Parity map for the destination format. Processing then continues at step 1720 where metadata is updated to change the designation of the source grid to that of the destination format. If the check performed at step 1718 determines that the destination format is RAID-0, processing continues at step 1720 where metadata is updated to change the designation of the source grid to that of the destination format. The steps of FIG. 17 support storage systems where some or all of the RSUs in a grid are allocated to a logical device. Less than all of the RSUs in a grid may be allocated if constrained allocation is employed, such as described relative to FIG. 9. In other embodiments, all RSUs in a grid may be allocated to a logical device.

Figure 18:
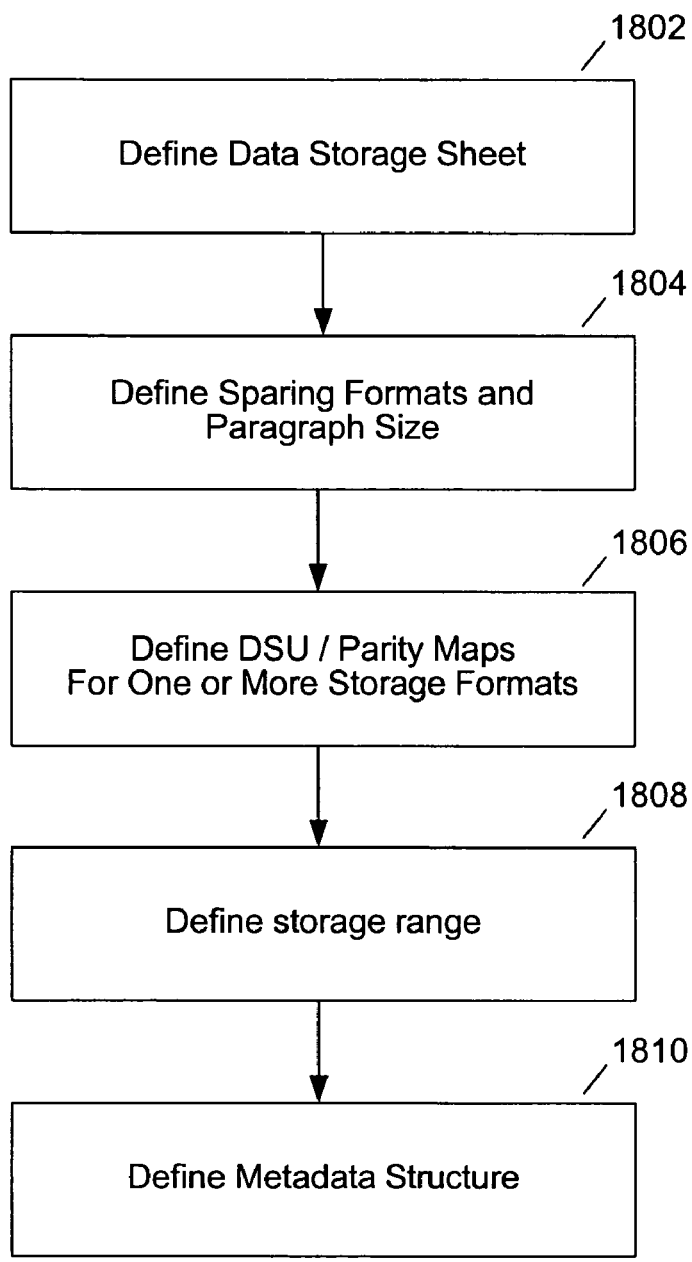
FIG. 18 depicts steps employed to define storage grids

FIG. 18 depicts steps employed to define storage grids. At step 1802, the number of drives comprising a sheet, the number of rows in a sheet, and the size of data blocks is defined. At step 1804, a sparing format is defined. The sparing format may employ distributed sparing, dedicated spares, no spares, or other formats. The sparing format when applied to the sheet then defines a capacity grid for each sheet. At step 1806, one or more DSU/Parity maps are defined for each data storage format supported. For example, maps may be defined for RAID-9, RAID-1, RAID-5, and RAID-6. At step 1808, the amount of storage to be configured as storage sheets is specified. Some or all of the available storage on drives comprising the array may be defined as sheets. As such, embodiments of the present invention may be used to wholly define a storage system or may be used to define a portion of available storage. The amount of available storage is used in defining the variable used to manage the grids. At step 1810, metadata structures for the grid are defined. These include sheet pointers, RSU pointers, DSU/Parity maps, a sparing table, and sheet format indicators. Metadata is described in greater detail in FIG. 19.

Figure 19:
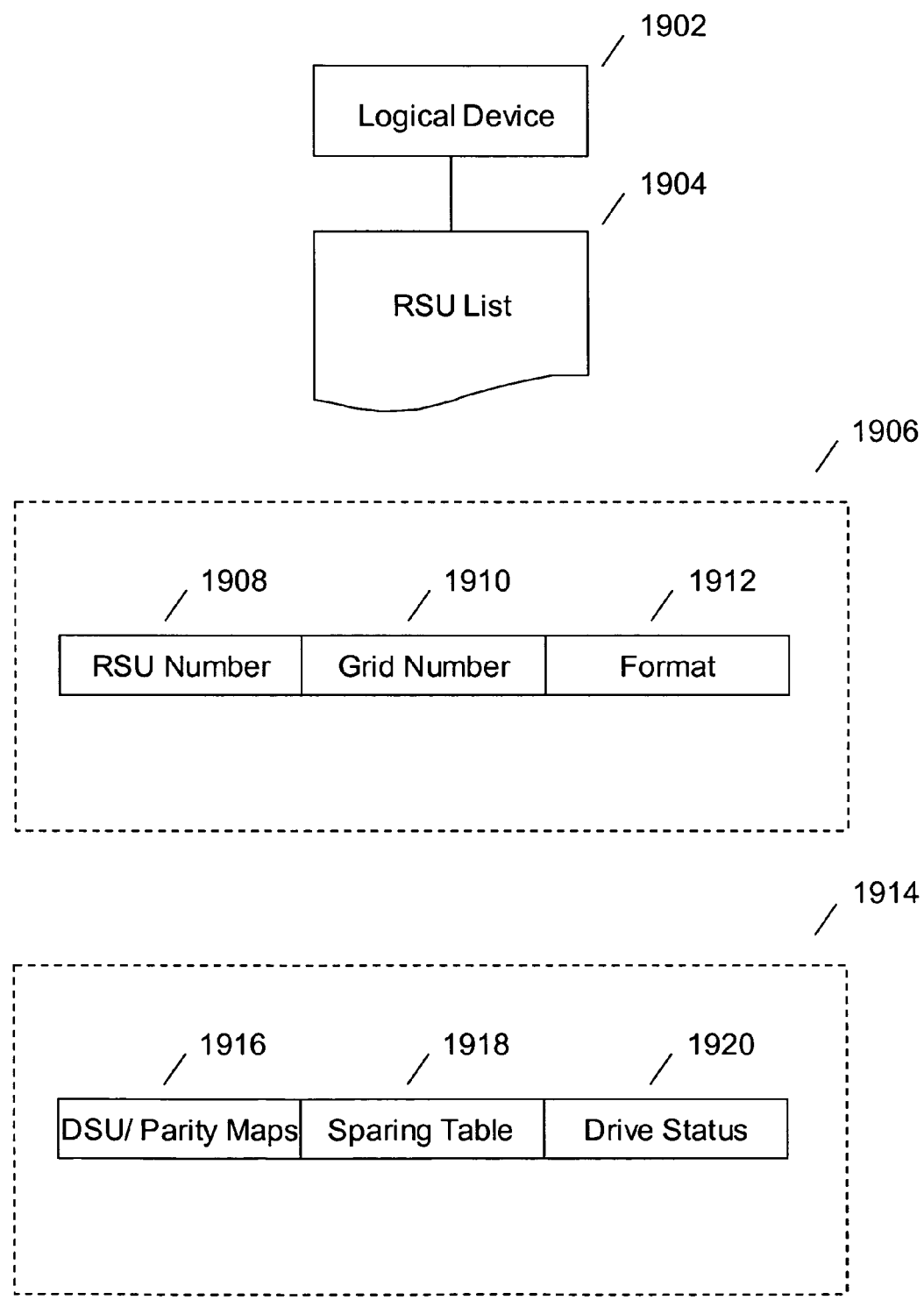
FIG. 19 in an example of metadata employed to utilize storage grids

FIG. 19 in an example of metadata employed to utilize storage grids. RSU list 1904 contains a list of RSUs and sheets allocated to logical unit 1902. For each logical unit, a list of RSUs and sheets are established. Alternatively, an RSU/sheet list may indicate the logical units to which RSUs are allocated. Allocation data 1906 is an example of metadata that may be stored for each allocated RSU. Allocation data 1906 comprises RSU pointer 1908, sheet pointer 1910, and sheet format 1912. The size of the RSU pointer depends upon the number of rows defined per sheet and the storage formats supported. In the example of FIG. 16, a 5 digit binary number may be used as an RSU pointer. The size of sheet numbers depends on the number of sheets and therefore reflects the number of rows per sheet and the storage capacity of the drives. System data 1914 is an example of system data that is employed when accessing data grids. DSU/Parity maps 1916 define user data and parity data blocks in the grid and define how parity or parities are calculated. Sparing table 1918 defines the drives that serve as spares or store user data and parity for each row of the storage system. Drive status 1920 indicates is a drive is operational, has failed, or is excluded from paired storage formats. Other metadata formats and content may be used. Allocation data may include a sparing indicator, or sparing information, indicating which sheets have been spared, may be implemented as part of system data 1914. Alternatively, sparing data that indicated which sheets have been spared may be temporary data and may exist for a duration during which sheets are spared and following sparing of a predetermined number of sheets, the sparing table may be modified to reflect data mapping after sparing.

FIG. 20 depicts steps employed to access data in a storage system employing data storage grids. At step 2002, a grid structure is defined in a storage system comprising a plurality of storage domains. At step 2004, RSUs of one or more grids are allocated to a logical device. Data blocks of the RSUs are logical blocks of the logical device. At step 2006, a metadata entry is created for each RSU allocated to the logical device. Alternatively, a metadata structure may be created for each sheet allocated to the logical device if all the RSUs in a sheet are allocated to the same logical device. At step 2008, an access request (read or write) is received requesting a logical block in the logical device. At step 2010 metadata for the RSU corresponding to the logical block is accessed. At step 2012, metadata that may comprise sheet allocation, a DSU/Parity Map, and a sparing table is processed to determine the drives and physical addresses for the data blocks associated with the RSU. Processing may employ lookup tables, hash tables, other data structures, or computational code and is not limited to a particular method. At step 2014 commands are issued to read data blocks of the RSU, write data blocks to the RSU, write mirror data, or read data blocks, calculate parity or parities, and write data blocks and parities depending on the storage format of the accessed grid.

Embodiments of the present invention define data storage formats that specify the number of rows and columns in a sheet, apply a sparing method to define a capacity grid, and that designate data blocks in the capacity grid as containing user data, mirror data or parity data that correspond to one or more storage formats. Other methods of defining the storage grid embodiments of the present invention may be employed. For example, a DSU/Parity grid may be defined and a sparing table may be defined and applied to the DSU/Parity grid in order to define sheet structure. As such, the foregoing descriptions are illustrative of how data grids can be defined and utilized and are not limiting in the exact manner employed to derive grid, sparing, and sheet structure. Embodiments of the present invention include packed parity storage wherein user data is placed in a first portion of a storage grid and parity or mirror data is placed in a another portion of the grid, providing optimized performance. The performance benefits of packed parity are realized independent of the paring method used. Sparing methods can include distributed sparing, dedicated sparing, or no sparing. For example, RAID-6 with no sparing may be employed to archive data to CDROMs, providing data retention in the event of failure of any two CDROMS and providing high read performance in accessing archived data.

Multiple embodiments of the present invention may be employed in a storage system. For example, a portion of a storage system may be configured with grids comprising a first number of rows and another portion of the storage system may be configured with grids comprising a second number of rows. Large grids may be employed to store video programs and smaller grids may be employed to store billing information, for example. While preceding figures employ disc drives to illustrate the nature of the present invention, however, the present invention is not limited to disc drives and may be employed using semiconductor RAMs, optical memories, or any other data storage structures or devices.

The sheet, sparing, and data storage formats supported by embodiments of the present invention are not limited to a specific number of storage domains or rows. For example, a grid may be defined that supports an 8+1 RAID-5 format where there are eight user data blocks and one parity block for each RSU. Fault tolerance examples have employed XOR created parities. Other coding methods including Reed-Solomon, ECC, RLL, and the like may be employed to provide fault tolerance. The examples shown in the figures implement a single storage format within a grid. Multiple formats may be implemented in a grid as may be reflected by a DSU/Parity map and metadata to support the multiple formats.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of storing data in a grid-based data storage system comprising:
    defining an array of equal capacity data storage units, each data storage unit defined as a grouped plurality of data storage blocks from separate storage domains fewer than a total available number of storage domains; and
    allocating each of the data storage units for storing either user data entirely or fault tolerance data entirely.

2. The method of claim 1 further comprising aligning a base address of each data storage unit allocated for storing user data with an address defined by a multiple of a size of the storage blocks.

3. The method of claim 1 further comprising defining a pointer that identifies a selected data storage unit.

4. The method of claim 1 wherein the fault tolerance data is characterized as either mirror data or parity data.

5. The method of claim 1 further comprising defining a sparing table that designates at least one data block in each row of said array as a spare data block.

6. The method of claim 5 further comprising defining said sparing table to contain a plurality of sparing versions that each specify a different storage domain as containing said at least one spare data block in each row.

7. The method of claim 1 further comprising creating a metadata entry that identifies each data storage unit and the respective array of a plurality of arrays in which each data storage unit exists.

8. The method of claim 7 wherein said metadata entry further comprises an entry indicating a storage format of each data storage unit.

9. A grid-based data storage system comprising an array of equal capacity data storage units, each data storage unit defined as a grouped plurality of data storage blocks from separate storage domains fewer than a total available number of storage domains, wherein each data storage unit is individually allocated for storing either user data entirely or fault tolerance data entirely.

10. The data storage system of claim 9 further comprising a plurality of spare storage blocks that are allocatable for storing data in the respective data storage units.

11. A method of storing data in a grid-based data storage system comprising:
    defining an array of equal capacity data storage units, each data storage unit defined as a grouped plurality of data storage blocks from separate storage domains fewer than a total available number of storage domains;
    allocating each of the data storage units for storing either user data entirely or fault tolerance data entirely in accordance with a selected first storage format; and
    reallocating the data storage units for storing either user data entirely or fault tolerance data entirely in accordance with a selected second storage format if the number of data storage units in the first storage format is less than or equal to the number of data storage units in the second storage format.

12. The method of claim 11 further comprising:
    defining a second array of equal capacity data storage units, each data storage unit defined as a grouped plurality of data storage blocks from separate storage domains; and
    allocating additional data storage units in the second array if the number of data storage units in the first storage format is greater than the number of data storage units in the second storage format.

13. The method of claim 11 comprising:
    determining the data storage format of said array;
    identifying an inaccessible storage domain accessing a sparing table that specifies at least one spare data block in each row of said array;
    accessing metadata corresponding to said data storage format that specifies the location and content of each data block in said array; and
    regenerating or copying data corresponding to each non-accessible data storage block to the respective spare data block.

14. A data structure stored on a storage medium having an array of equal capacity data storage units, each data storage unit defined as a grouped plurality of data storage blocks from separate storage domains fewer than a total available number of storage domains, the data structure comprising a pointer that when multiplied by a storage capacity of said data storage blocks and by the number of rows of data storage units allocated for storing user data, and to which an offset, if any, is added, produces a base address in each storage domain.

15. A method of accessing data in a data storage system comprising:
    defining an array of equal capacity data storage units, each data storage unit defined as a grouped plurality of data storage blocks from separate storage domains fewer than a total available number of storage domains;
    determining a domain and a physical address for at least one data storage block by applying an array pointer value to determine a base address of said array, applying a data storage unit pointer value to determine at least one domain to be accessed and to determine a row such that the row number minus one is multiplied by a capacity of said storage blocks and added to a base address to produce a physical address; and
    issuing an access command to said at least one domain that includes said physical address.

16. The data storage system of claim 9 wherein the data storage blocks are of equal capacity.

17. The data storage system of claim 9 wherein within a particular row, a data storage block in a first domain has the same logical address as a data storage block in a second domain.

18. The data storage system of claim 9 wherein the array is adapted for storing data in the data storage blocks in a selected storage format by predetermined arrangements of user data, mirror data, and parity data associated with each of a plurality of selectable storage formats.

19. The data storage system of claim 18 wherein the predetermined arrangement defines at least one row in the array that contains no mirror or parity data in the data storage blocks.

20. The data storage system of claim 19 wherein the array is adapted for storing data in a RAID 5 or RAID 6 storage format.

21. The data storage system of claim 9 further comprising metadata defining a pointer for identifying a selected data storage unit.

22. The data storage system of claim 9 wherein a base address of each data storage unit allocated for storing user data is aligned with an address defined by a multiple of a size of the storage blocks.

23. The data storage system of claim 9 wherein the fault tolerance data comprises either mirror data or parity data.

* * * * *